(12) United States Patent
Zhang et al.

(10) Patent No.: US 10,013,380 B2
(45) Date of Patent: Jul. 3, 2018

(54) METHOD AND SYSTEM FOR ADDRESS DECODING IN A DATA COMMUNICATIONS SYSTEM USING A SERIAL DATA TRANSFER BUS

(71) Applicant: NXP B.V., Eindhoven (NL)

(72) Inventors: Hongyun Zhang, Shanghai (CN); Jian Qing, Shanghai (CN); Tinghua Yun, Shanghai (CN)

(73) Assignee: NXP B.V., Eindhoven (NL)

( * ) Notice: Subject to any disclaimer, the term of this patent is extended or adjusted under 35 U.S.C. 154(b) by 210 days.

(21) Appl. No.: 15/079,133

(22) Filed: Mar. 24, 2016

(65) Prior Publication Data

US 2016/0292113 A1 Oct. 6, 2016

(30) Foreign Application Priority Data

Mar. 31, 2015 (CN) .......................... 2015 1 0149912

(51) Int. Cl.
*G06F 1/32* (2006.01)
*G06F 13/42* (2006.01)
*G06F 13/40* (2006.01)
*G06F 13/364* (2006.01)

(52) U.S. Cl.
CPC .......... *G06F 13/404* (2013.01); *G06F 1/3203* (2013.01); *G06F 1/325* (2013.01); *G06F 1/3206* (2013.01); *G06F 1/3215* (2013.01); *G06F 1/3228* (2013.01); *G06F 13/364* (2013.01); *G06F 13/4291* (2013.01); *G06F 2213/0016* (2013.01); *Y02D 10/14* (2018.01); *Y02D 10/151* (2018.01)

(58) Field of Classification Search
CPC .... G06F 1/3203; G06F 1/3206; G06F 1/3215; G06F 1/3228; G06F 1/325; G06F 1/3253; G06F 13/385; G06F 13/4282; G06F 13/4286; G06F 2213/0016
See application file for complete search history.

(56) References Cited

U.S. PATENT DOCUMENTS

| 7,788,431 B2 | 8/2010 | Deshpande et al. |
| 2006/0227798 A1 | 10/2006 | Hou et al. |
| 2012/0159025 A1 | 6/2012 | Tailliet |
| 2016/0170930 A1* | 6/2016 | Weng .................. G06F 13/4282 710/110 |

OTHER PUBLICATIONS

UM10204, I2C—bus specification and user manual, Rev.5; 64 pages (Oct. 9, 2012).

* cited by examiner

*Primary Examiner* — Glenn A Auve

(57) ABSTRACT

Embodiments of a method and system are disclosed. One embodiment of a method for address decoding in a data communications system using a serial data transfer bus is disclosed. The method involves, detecting a start command from a master device of the data communications system at the serial data transfer bus, and disabling an address decoder of a slave device of the data communications system in response to the detecting the start command.

20 Claims, 12 Drawing Sheets

METHOD AND SYSTEM FOR ADDRESS DECODING IN A DATA COMMUNICATIONS SYSTEM USING A SERIAL DATA TRANSFER BUS

CROSS-REFERENCE TO RELATED APPLICATIONS

This application claims the priority under 35 U.S.C. § 119 of China patent application no. 201510149912.X, filed Mar. 31, 2015 the contents of which are incorporated by reference herein.

A widely adopted bi-directional two-line bus for efficient inter-IC control is known as the inter-IC or I2C bus (also referred to as "I²C"). The I2C bus is described in detail in, for example, the "I²C-bus specification and user manual," Rev. 5, 9 Oct. 2012 ("I2C specification"). According to the I2C specification, integrated circuits (ICs) are connected by two bus lines or "wires," a serial data (SDA) line and a serial clock (SCL) line. Both the SDA line and the SCL line are bidirectional lines, connected to a positive voltage supply, e.g., $V_{DD}$, via a current source or a pull-up resistor. Data is transmitted in I2C frames on the SDA line in 8-bit bytes, with each byte followed by an Acknowledge (ACK) bit or a Not Acknowledge (NACK) bit, and clocking information is transmitted on the SCL line.

Reducing the power dissipation associated with an I2C bus can improve the power efficiency of an I2C compatible device. For example, for a battery-powered device, such as a portable consumer device (e.g., a camera or a mobile phone), reducing power consumption of I2C bus communications can extend the overall operating time of the battery-powered device.

Embodiments of a method and system are disclosed. One embodiment of a method for address decoding in a data communications system using a serial data transfer bus is disclosed. The method involves, detecting a start command from a master device of the data communications system at the serial data transfer bus, and disabling an address decoder of a slave device of the data communications system in response to the detecting the start command.

In an embodiment, a method for address decoding in a data communications system using a serial data transfer bus involves detecting a start command from a master device of the data communications system at the serial data transfer bus and disabling an address decoder of a slave device of the data communications system in response to detecting the start command.

In an embodiment, a method for address decoding in an I2C system that includes a master I2C device and at least one slave I2C device that are connected by an I2C bus including an SDA line and an SCL line involves at a slave I2C device of the I2C system, detecting an I2C start command from the master I2C device at the I2C bus, and disabling an address decoder of the slave I2C device in response to detecting the I2C start command.

In an embodiment, an I2C device with connection to an I2C bus including an SDA line and an SCL line includes an address decoder configured to decode an address for the I2C device and an address decoder controller configured to detect an I2C start command from a master I2C device at the I2C bus and disable the address decoder in response to the detection of the I2C start command.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
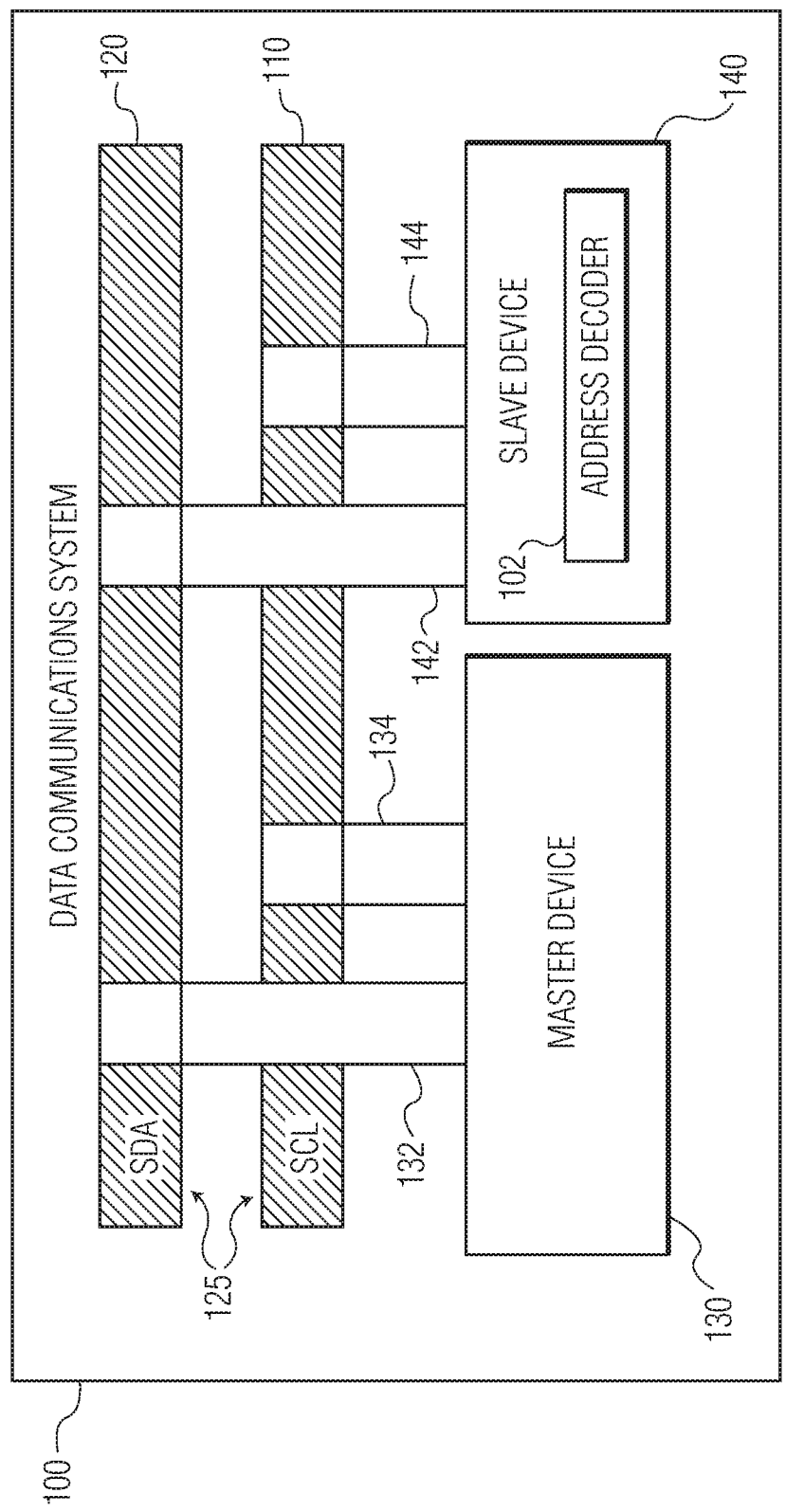
FIG. 1 is a block diagram of a data communications system in accordance with an embodiment of the present invention.

FIG. 1 is a block diagram of a data communications system 100 in accordance with an embodiment of the present invention. In some embodiments, the data communications system is an I2C compatible communications system and can be used for communications between IC circuits such as baseband processors and microcontrollers. In an embodiment, the data communications system may be an electronic device, which is, for example, a computer device such as a personal computer (PC), a laptop computer, a tablet or pad computer, or a smartphone. In the data communications system depicted in FIG. 1, an SDA line 120 for the communication of data and an SCL line 110 for the control and synchronization of the communication of data are arranged as an I2C bus 125. Each device that is connected to the I2C bus is identifiable by an address, and can operate as either a transmitter or a receiver, or both. Data transfers are conducted in the data communications system using a master-slave communications protocol. A master device is a device that initiates a data transfer and generates the clock signals to permit the transfer, while any device that is addressed is considered a slave device for this transfer. The data transfer can be initiated by a master to either transmit data to the slave (herein designated as write), or to to request data from the slave (herein designated as read). For example, an output device, such as a display screen, is typically not able to initiate a data transfer, and therefore is configured to only operate as a slave device. A microprocessor, on the other hand, is typically be configured to operate as either a master device or a slave device, as the situation demands.

In the data communications system depicted in FIG. 1, a master device 130 and at least one slave device 140 are attached to the I2C bus 125. The master device is electrically connected to the I2C bus using a data connection 132 and a clock connection 134 electrically connected to the SDA line 120 and the SCL line 110, respectively. The slave device is electrically connected to the I2C bus using a data connection 142 and a clock connection 144 electrically connected to the SDA line and the SCL line, respectively. In an embodiment, the master device and at least one slave device are attached to the same printed circuit board (PCB) (not shown) that is located within an electronic device.

In some embodiments, the data communications system 100 implements dynamic changing and decoding of slave device addresses. In one embodiment, the master device 130 addresses the slave device 140 using a current device address and performs an I2C transaction with the slave device. The slave device detects a START condition, and subsequently decodes its address, for example, using an address decoder 102. The master changes the slave device's address and stores the slave's new address information in memory for future use.

Figure 2:
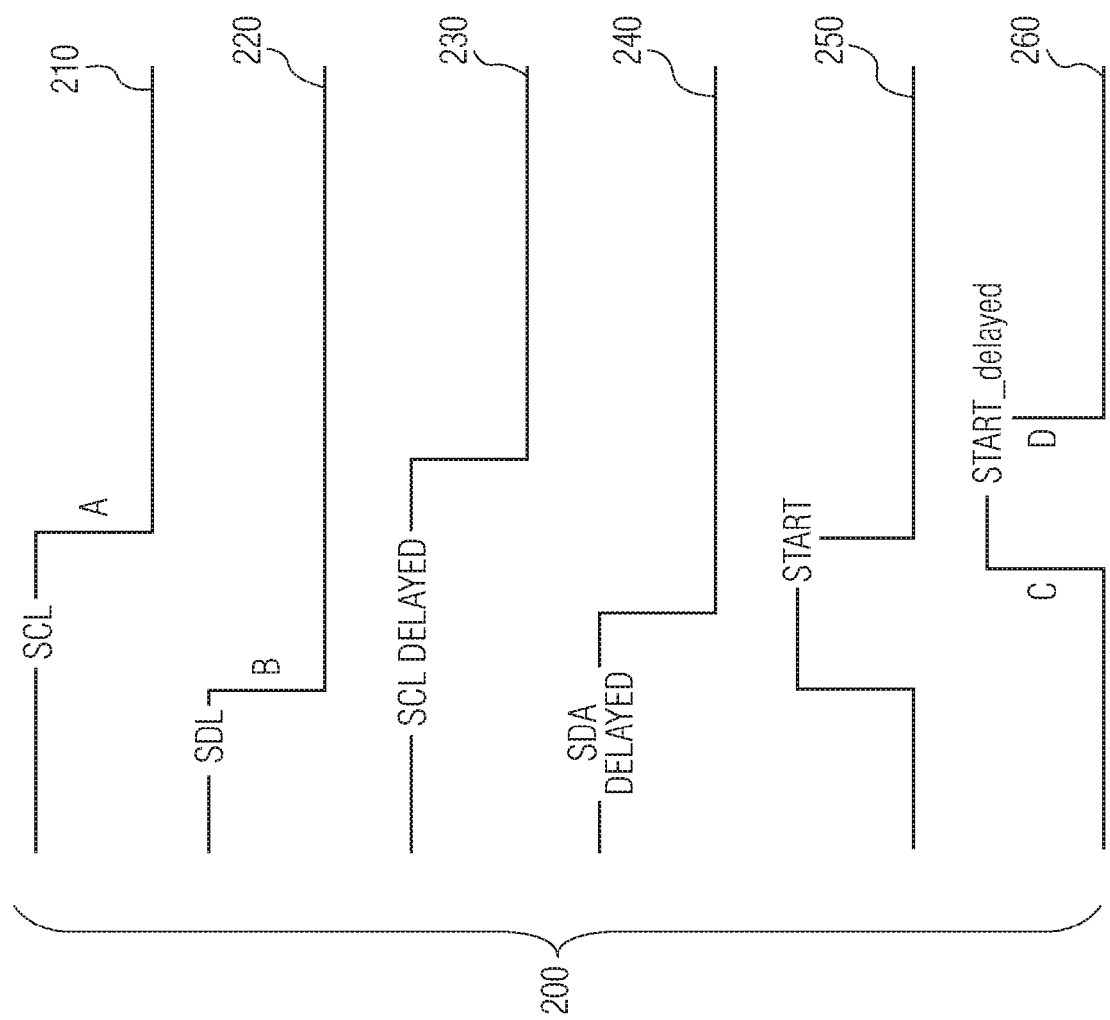
FIG. 2 depicts a signal timing diagram for the data communications system depicted in FIG. 1 that is compatible with an I2C communications protocol.

FIG. 2 depicts a signal timing diagram 200 for the data communications system depicted in FIG. 1 that is compatible with an I2C communications protocol. In the timing diagram depicted in FIG. 2, slave addresses are decoded based on inputs on an I2C SCL line 210 and an I2C SDA line 220. A START condition (as defined in the I2C protocol) is illustrated in a START line 250.

In a quiescent state, both the SCL line 210 and the SDA line 220 are in the logic high state (herein designated as HIGH, or logic state of 1). A master device initiates a data transfer by asserting a transition to a logic-low state (herein designated as LOW, or logic state of 0) on the SDA line while the SCL line is HIGH, which is termed a START command/condition. Thereafter, the master device toggles the SCL line to control the synchronization of the data transfer and data value changes occur on the SDA line when the SCL line is LOW. In some embodiments, after the START command/condition, the master device transmits an address, followed by a read/write-not indicator, which indicates the direction of data transfer. After transmitting the address and the read/write-not indicator, the master device releases the SDA line, allowing it to rise to a logic-high level. If a slave device decodes and recognizes its address, the slave device transmits an acknowledge signal (ACK) by pulling the bus LOW. The absence of a low signal when the master device releases the SDA line, therefore, indicates a non-acknowledgement (NAK). If the address is acknowledged, via a low at SDA, the master device transmits the data. If the direction of data transfer is a "read," the slave device is the transmitting device. If the direction is a "write," the master device is the transmitting device. The transmitting device releases control of the SDA line, and the receiving device acknowledges the receipt of the data by asserting a logic-low value on the SDA line. If the data is acknowledged, the transmitting device sends additional data. This process continues until the entirety of the data is communicated, or until a transmitted data item is not-acknowledged. The master device can subsequently reassert a START signal, and repeat the process above, or, can assert a STOP command/signal to terminate this data-transfer session. To terminate a data transfer, the master device asserts a low-to-high transition on the SDA line while the SCL clock is high, which is termed a STOP condition. Thereafter, any device may assume control of the I2C bus as a master device by asserting a high-to-low transition on the SDA line.

During the START command/condition, the SCL line 210 is HIGH while the SDA line 220 makes a transition from HIGH to LOW. The slave address of a slave device can be decoded, for example, by a slave address decoder, based on the inputs on the SCL line, the SDA line, and the START line 250. For example, if the address pin of a slave device is connected to one of the SCL line, the SDA line, and the START line, the address pin will transition from HIGH to LOW when the corresponding line transitions from HIGH to LOW. The slave address decoder circuit detects this transition on the address pin and stores that information in a register for future reference.

In order to detect the transitions on the address pin of a slave device, without any external clock, delay cells are used to generate delayed versions of the address pin. For example, in the timing diagram depicted in FIG. 2, signals on the SCL line 210, the SDA line 220, and the START command signal/line 250 are delayed using delay cells to provide a delayed SCL 230, a delayed SDA 240, and a delayed START 260. The first HIGH to LOW transition on the SDA line 220 (denoted by "B" in the timing diagram) is used to latch the value of the delayed version of the address pin of a slave device. This sets the value of the address pin before the SDA has transitioned. If this value is LOW, it is determined that the address pin is connected to GND. The first HIGH to LOW transition on the SCL line (denoted by "A" in the timing diagram) is also used to latch the value of the delayed version of the address pin of a slave device. This sets the value of the address pin before the SCL line transitions. If the value is LOW, it is determined that the address pin is connected to either GND or SDA. The rising edge on the delayed START line, (denoted by "C" in the timing diagram) is used to latch the value of the address pin after the falling edge transition on the SDA line to detect if the address pin changes with the SDA line. The falling edge of the delayed START line (denoted by "D" in the timing diagram) is used to latch the detection of the address pin's connection to SCL and SDA. For example, it is determined that the address pin is connected to GND if the address pin value is LOW at B. It is determined that the address pin is connected to SDA if the address pin maintains a HIGH at B and a LOW at C. It is determined that the address pin is connected to SCL if the address pin maintains a HIGH at C and a LOW at D. It is determined that the address pin is connected to VDD if the address pin maintains a HIGH at A, as well as at D. Depending on the combination of the four signals, SCL, SDA, VDD, GND, and the number of address pins used, the slave address is decoded during every START condition and stored for reference.

Figure 3:
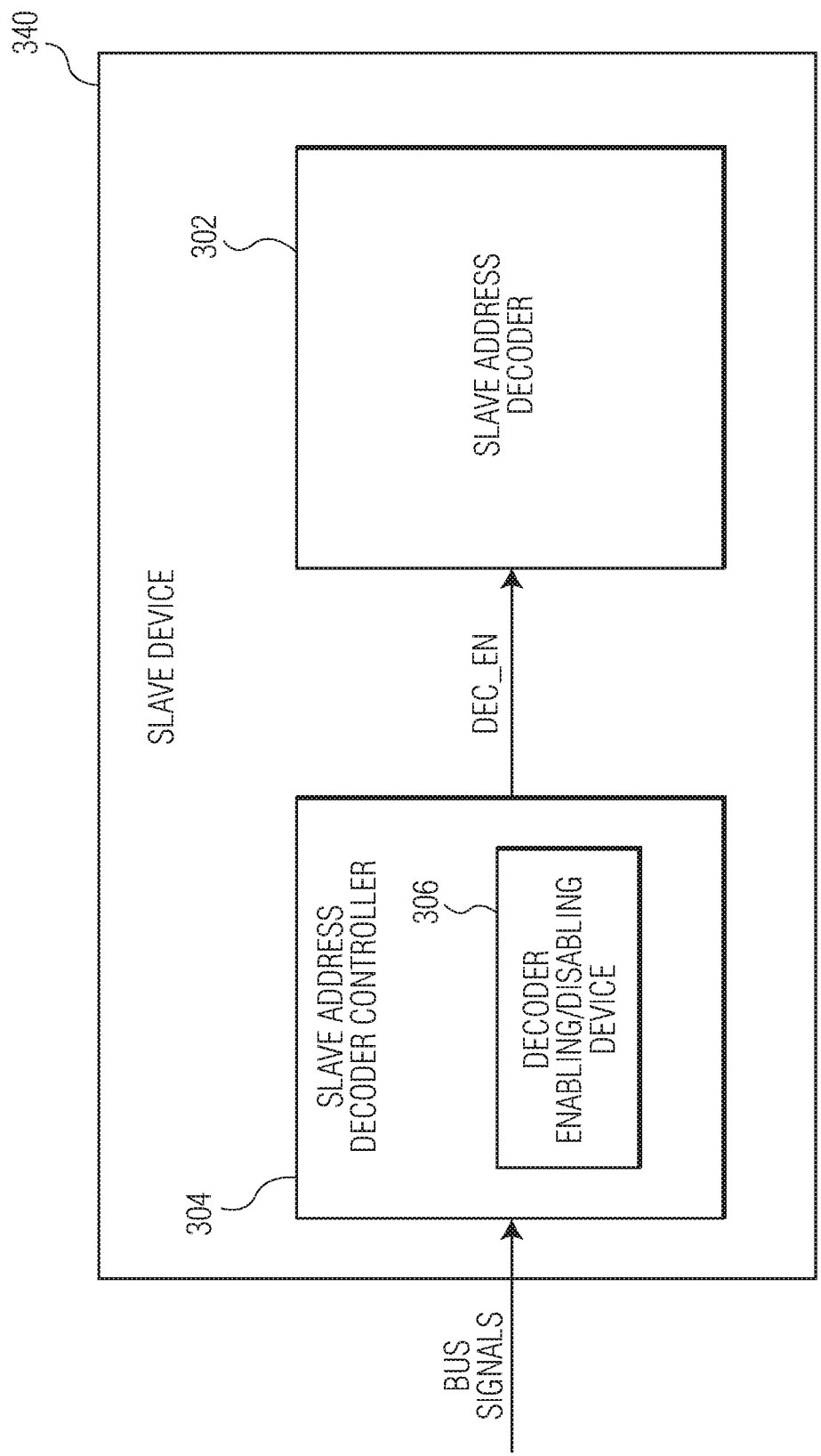
FIG. 3 depicts an embodiment of a communications device of the data communications system depicted in FIG. 1.

FIG. 3 depicts an embodiment of the slave device 140 depicted in FIG. 1. In the embodiment depicted in FIG. 3, a slave device 340 includes a slave address decoder 302 and a slave address decoder controller 304, which includes a decoder enabling/disabling device 306 that can be used to enable or to disable the slave address decoder. The decoder enabling/disabling device can detect bus signals presented at the I2C bus 125 and generate a decoder enabling/disabling signal, "DEC_EN," to enable or to disable a slave address decoder to reduce the to power consumption of the slave address decoder. In some embodiments, the decoder enabling/disabling device disables the slave address decoder circuit after the slave address is decoded. For example, the decoder enabling/disabling device keeps the slave address decoder active during a slave address decoding time period and disables the slave address decoder right after the slave address decoding time period. Compared to a data communications system in which the slave address decoder operates continuously, the slave address decoder controller can significantly reduce the power consumption of the address decoder circuit and consequently, reduces power consumption of communications devices within the data communications system. For example, because the slave address decoder is disabled for a long time period and only enabled for a short time period for address decoding, the slave address decoder controller can reduce the power consumption of the slave address decoder to a negligible amount.

Figure 4:
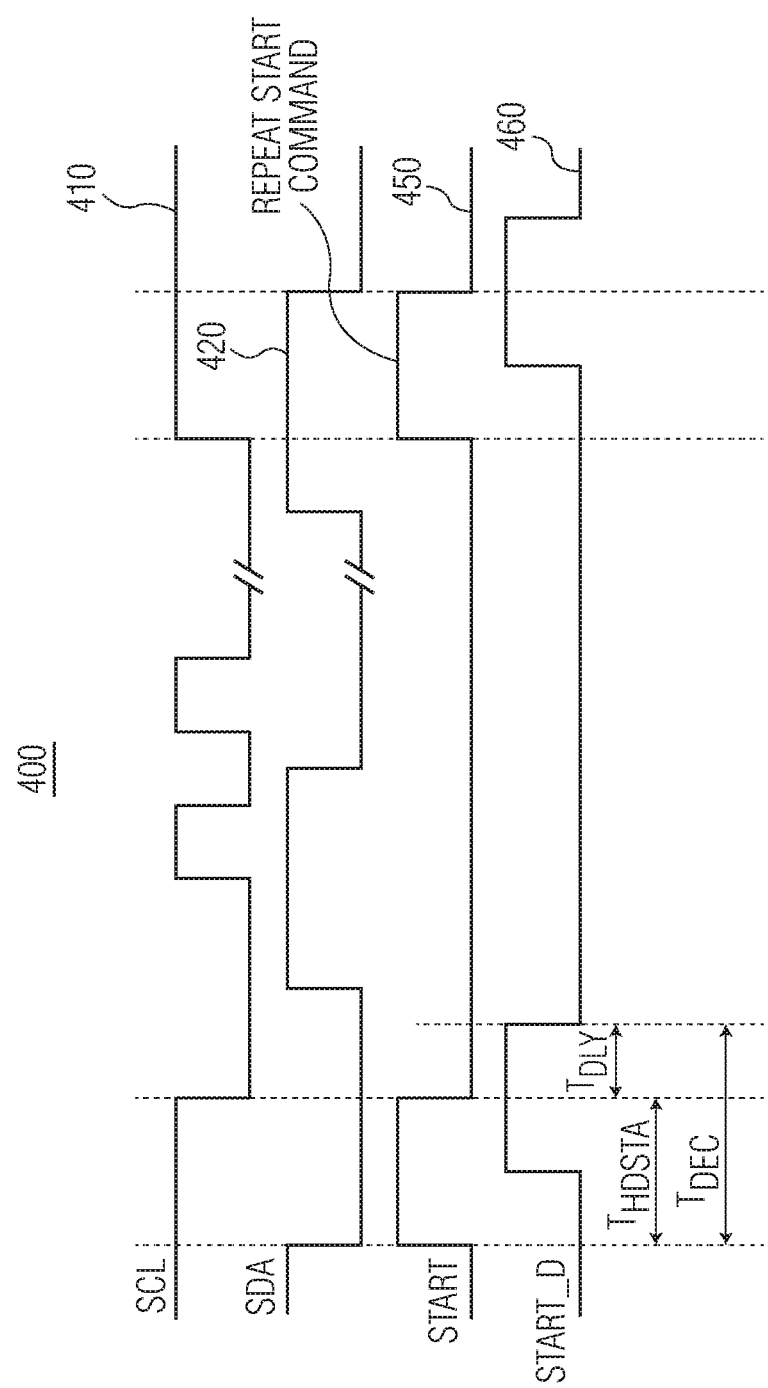
FIG. 4 depicts a signal timing diagram of a valid START command for the communications device depicted in FIG. 3.

FIG. 4 depicts a signal timing diagram 400 of a valid START command for the slave device 340 depicted in FIG. 3. In the signal timing diagram depicted in FIG. 4, a SCL line 410, an SDA line 420, a START command signal 450, "START," which instructs the slave device 340 to begin a data transfer with a corresponding master device, a delayed START command signal 460, "START_D," are illustrated. The START command signal, START, transitions from logic low to logic high, and the delayed START command signal, START_D, transitions from logic low to logic high, while the START command signal, START, is still at logic high. For the slave address decoder, the address decoding time duration is equal to the sum of the I2C standard specified START command hold time and the I2C START command delayed time. The address decoding duration can be expressed as:

$$T_{DEC} = T_{HDSTA} + T_{DLY}, \quad (1)$$

where $T_{DEC}$ represents the address decoding time, $T_{HDSTA}$ represents the START command hold time, and $T_{DLY}$ represents the START command delayed time, which is the time between the falling edge of the START command and the falling edge of the delayed START command, "START_D." If the start command hold time, $T_{HDSTA}$, is greater than the START command delayed time, $T_{DLY}$, the START command is determined as a valid START command, as shown in FIG. 4. In the I2C specification, the START command hold time, $T_{HDSTA}$, has a minimum value that is larger than the maximum value of the START command delayed time, $T_{DLY}$. If the START command hold time, $T_{HDSTA}$, is greater than the START command delayed time, $T_{DLY}$, it is determined that the START command conforms to the I2C specification. In an embodiment, the typical value of the START command delayed time, $T_{DLY}$, is 60 ns, and the maximum value of the START command delayed time can be set to 80 ns. The I2C address decoding is completed after the delayed START command (START_D) is de-asserted (i.e., transitions from logic high (1) to logic low (0)). A repeat START command from the same master device does not cause a repeat of the decoding of the slave address.

Figure 5:
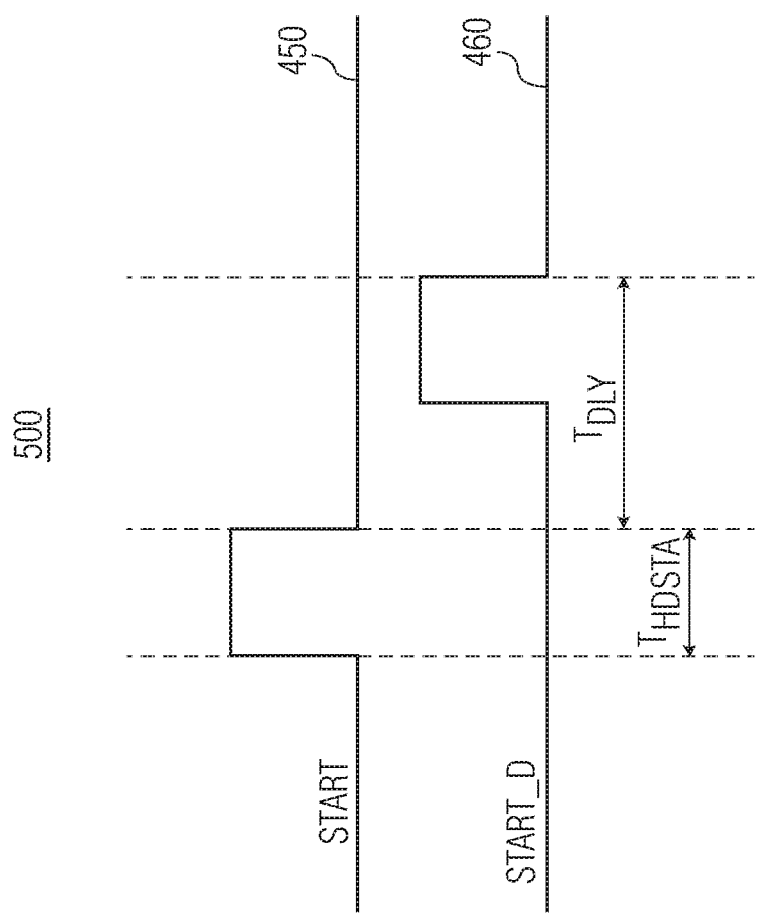
FIG. 5 depicts a signal timing diagram of a faulty START command for the communications device depicted in FIG. 3.

FIG. 5 depicts a signal timing diagram 500 of a faulty START command for the slave device 340 depicted in FIG. 3. Because the start command hold time, $T_{HDSTA}$, is less than or equal to the START command delayed time, $T_{DLY}$, the START command is determined as a faulty START command. In the I2C specification, the START command hold time, $T_{HDSTA}$, has a minimum value that is larger than the maximum value of the START command delayed time, $T_{DLY}$. If the START command hold time, $T_{HDSTA}$, is less than the START command delayed time, $T_{DLY}$, it is determined that the START command violates the I2C specification. For example, the START command hold time, $T_{HDSTA}$, may have a minimum value of 260 ns for a higher frequency mode and a minimum value that is greater than 260 ns for a lower frequency mode, while the START command delayed time, $T_{DLY}$, may have a maximum value of 80 ns. If the START command hold time, $T_{HDSTA}$, is less than 80 ns, it is determined that the START command violates the I2C specification.

Figure 6:
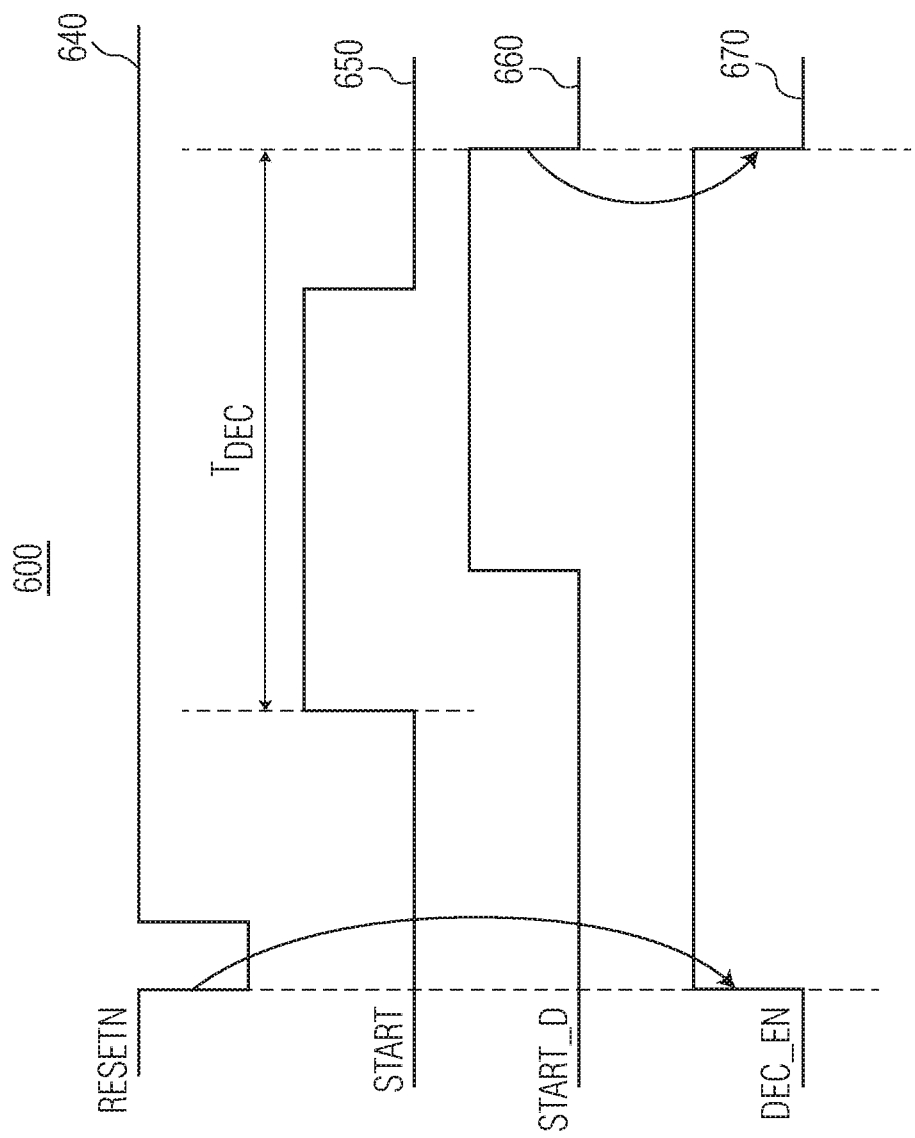
FIG. 6 depicts a signal timing diagram of the communications device depicted in FIG. 3 that illustrates an operation of an address decoder controller of the communications device.

FIG. 6 depicts a signal timing diagram 600 of the slave device 340 depicted in FIG. 3 that illustrates an operation of the slave address decoder controller 304. In the signal timing diagram depicted in FIG. 6, a reset signal 640, "ResetN," a START command signal 650, "START," and a delayed START command signal 660, "START_D," are input into the slave address decoder controller and a decoder enabling/disabling signal 670, "DEC_EN," is output from the slave address decoder controller to enable or disable the slave address decoder 302. The reset signal, ResetN, can be used to set or reset the decoder enabling/disabling signal, DEC_EN. As shown in FIG. 6, after the falling edge of the reset signal, ResetN, the decoder enabling/disabling signal, DEC_EN, is set to logic high and the slave address decoder is enabled by the slave address decoder controller. Subsequently, the START command signal, START, transitions from logic low to logic high, and the delayed START command signal, START_D, transitions from logic low to logic high, while the START command signal, START, is still at logic high, and a valid START command is determined. The decoding of the slave address is performed by the slave address decoder during the address decoding duration, $T_{DEC}$, which is the time between the rising edge of the START command signal, START, and the falling edge of the delayed START command signal, START_D. After the falling edge of the delayed START command signal, START_D, the decoder enabling/disabling signal, DEC_EN, transitions to logic low and the slave address decoder is disabled by the slave address decoder controller.

Figure 7:
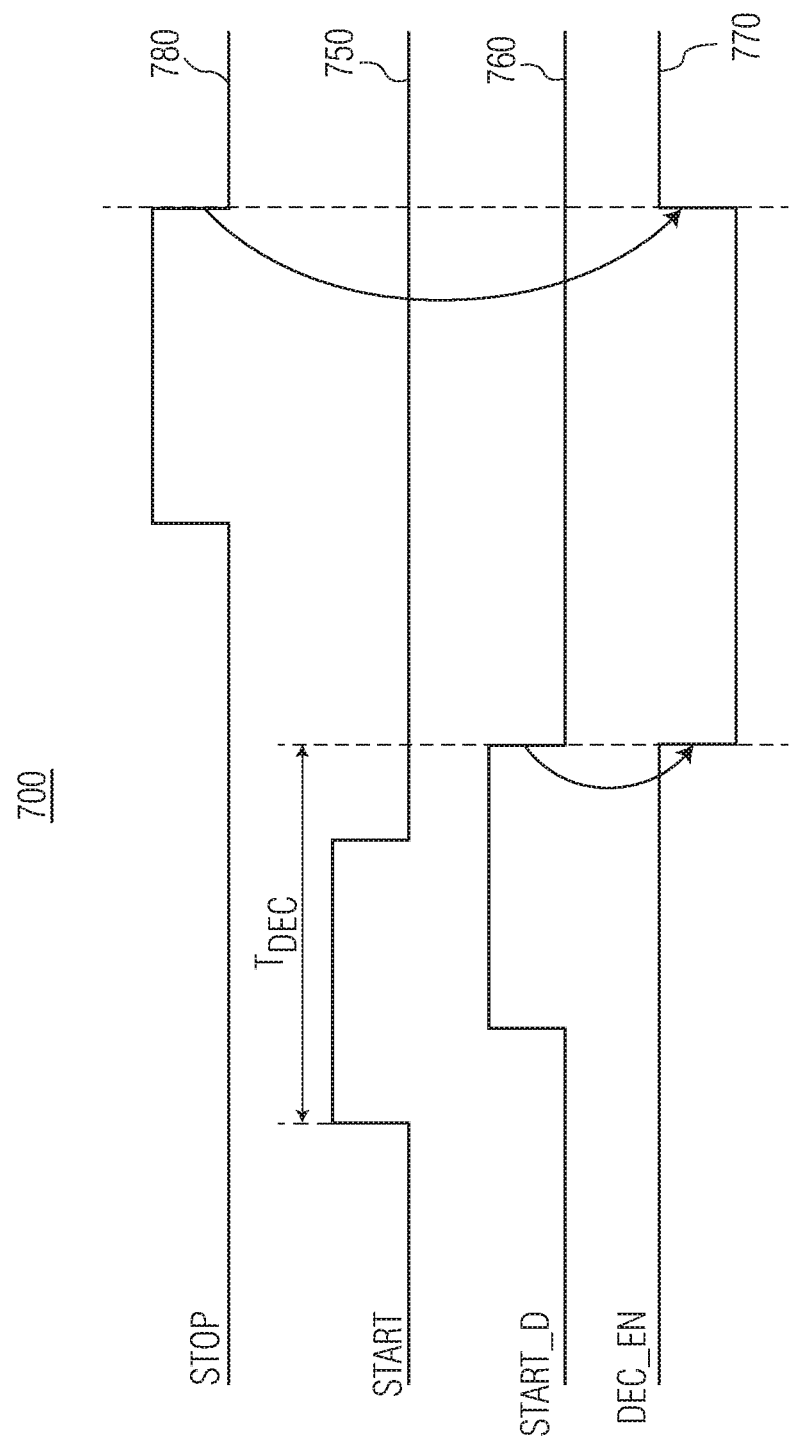
FIG. 7 depicts a signal timing diagram of the communications device depicted in FIG. 3 that illustrates another operation of the address decoder controller of the communications device.

FIG. 7 depicts a signal timing diagram 700 of the slave device 340 depicted in FIG. 3 that illustrates another operation of the slave address decoder controller 304. In the signal timing diagram depicted in FIG. 7, a START command signal 750, "START," a delayed START command signal 760, "START_D," and a STOP command signal 780, "STOP," which instructs the slave device to terminate a data transfer with a corresponding master device, are input into the slave address decoder controller and a decoder enabling/disabling signal 770, "DEC_EN," is output from the slave address decoder controller to enable or disable the slave address decoder 302. The STOP command signal, STOP, can be used to terminate a data transfer between the slave device 340 and a corresponding master device. As shown in FIG. 7, the START command signal, START, transitions from logic low to logic high, and the delayed START command signal, START_D, transitions from logic low to logic high, while the START command signal, START, is still at logic high, and a valid START command is determined. The decoding of the slave address is performed by the slave address decoder during the address decoding duration, $T_{DEC}$, which is the time between the rising edge of the START command signal, START, and the falling edge of the delayed START command signal, START_D. After the falling edge of the delayed START command signal, START_D, the decoder enabling/disabling signal, DEC_EN, transitions to logic low and the slave address decoder is disabled by the slave address decoder controller. After the falling edge of the STOP command signal, STOP, the decoder enabling/disabling signal, DEC_EN, is set to logic high and the slave address decoder is enabled by the slave address decoder controller.

Figure 8:
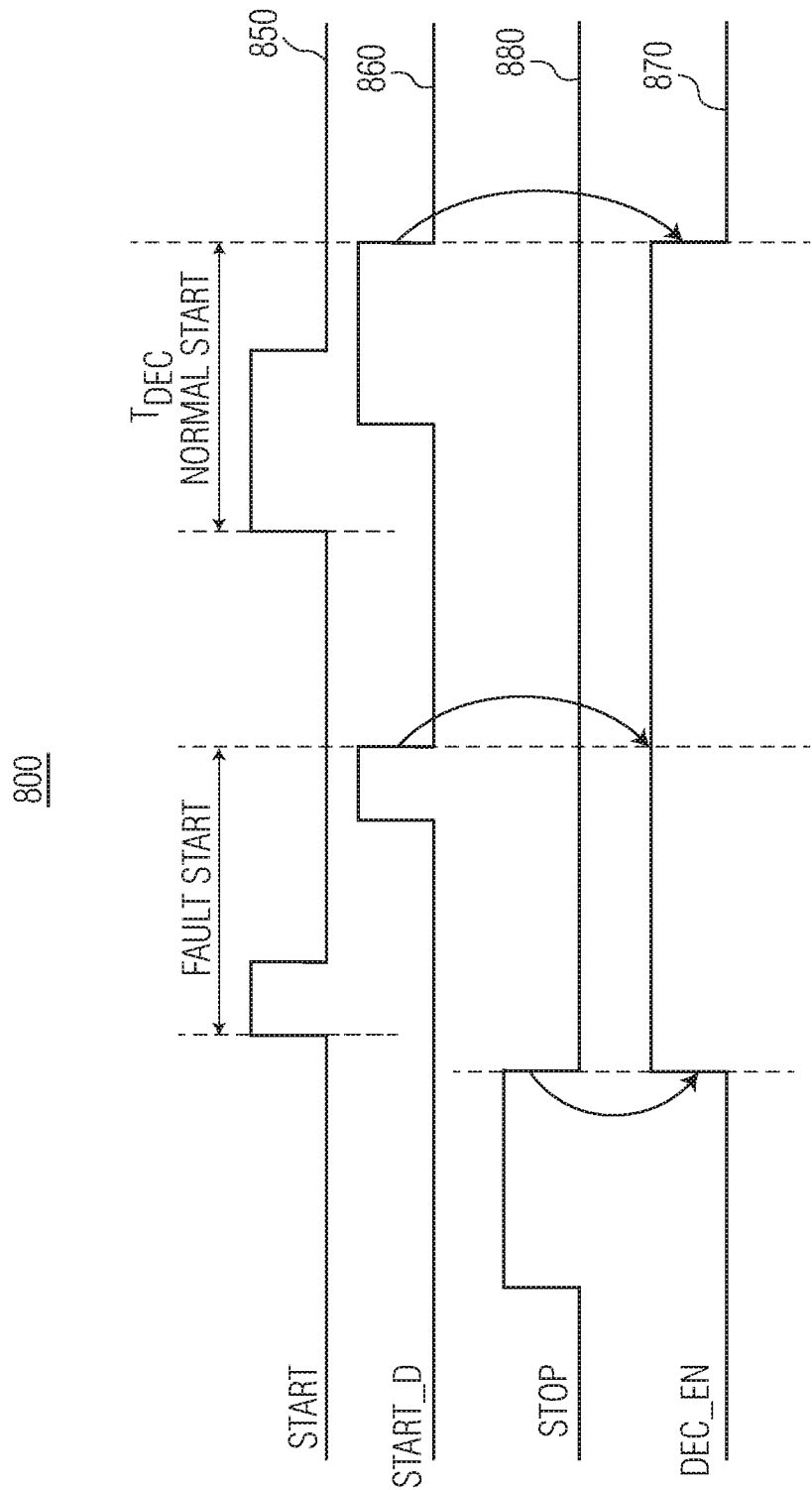
FIG. 8 depicts a signal timing diagram of the communications device depicted in FIG. 3 that illustrates yet another operation of the address decoder controller of the communications device.

FIG. 8 depicts a signal timing diagram 800 of the slave device 340 depicted in FIG. 3 that illustrates another operation of the slave address decoder controller 304. In the signal timing diagram depicted in FIG. 8, a START command signal, "START," a delayed START command signal, "START_D," and a STOP command signal, "STOP," are input into the slave address decoder controller and a decoder enabling/disabling signal, "DEC_EN," is output from the slave address decoder controller to enable or disable the slave address decoder 302. After the falling edge of the STOP command signal, STOP, the decoder enabling/disabling signal, DEC_EN, is set to logic high and the slave address decoder is enabled by the slave address decoder controller. Subsequently, in a faulty start, the START command signal, START, transitions from logic low to logic high, and the delayed START command signal, START_D, transitions from logic low to logic high, after the START command signal, START, transitions back to logic low. Next, in a normal start, the START command signal, START, transitions from logic low to logic high, and the delayed START command signal, START_D, transitions from logic low to logic high, while the START command signal, START, is still at logic high. The decoding of the slave address is performed by the slave address decoder during the address decoding duration, $T_{DEC}$, which is the time between the rising edge of the START command signal, START, and the falling edge of the delayed START command signal, START_D. After the falling edge of the delayed START command signal, START_D, the decoder enabling/disabling signal, DEC_EN, transitions to logic low and the slave address decoder is disabled by the slave address decoder controller.

Figure 9:
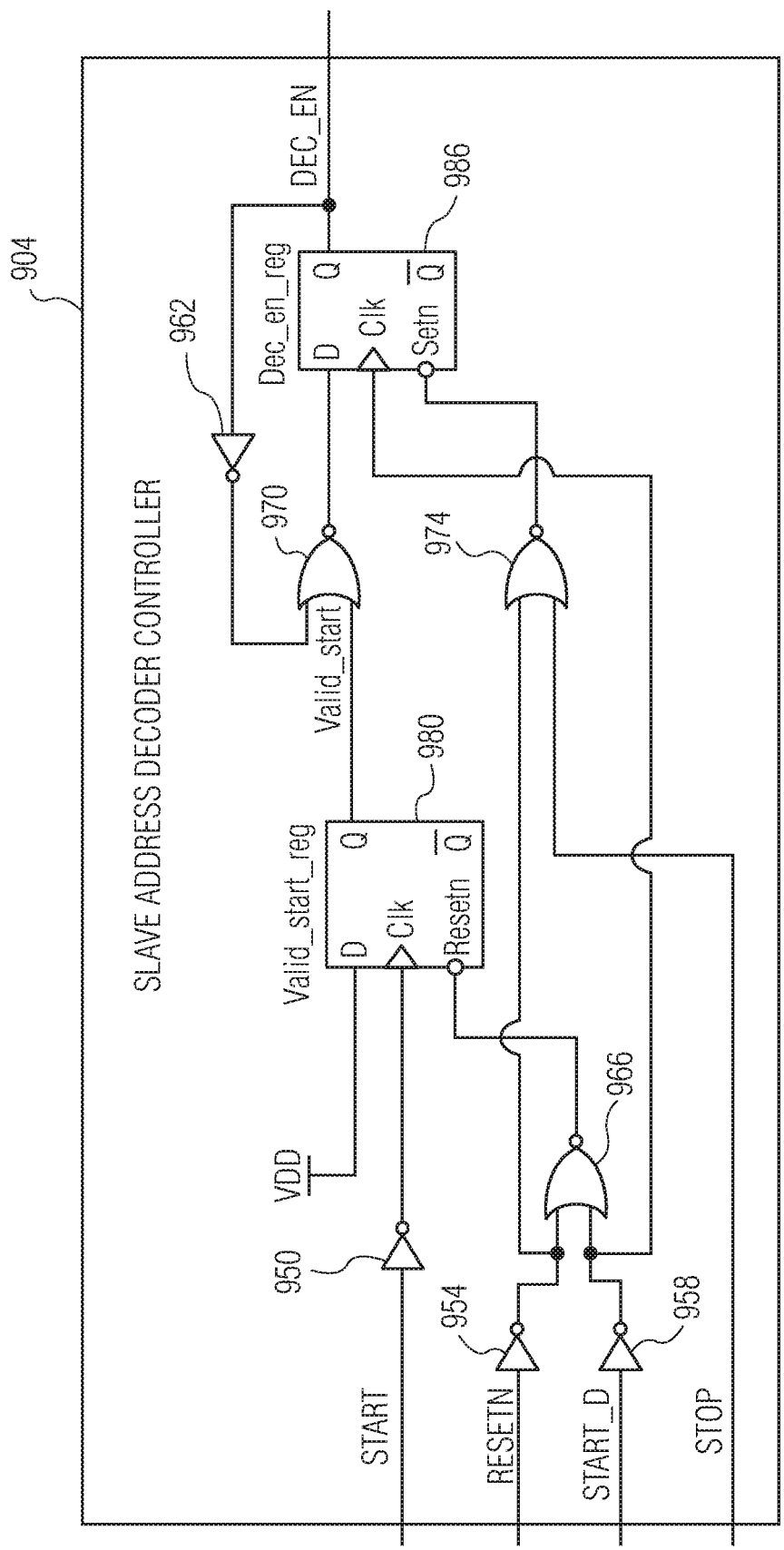
FIG. 9 depicts an embodiment of the address decoder controller of the communications device depicted in FIG. 3.

FIG. 9 depicts an embodiment of the slave address decoder controller 304 depicted in FIG. 3. In the embodiment depicted in FIG. 9, a slave address decoder controller 904 includes four inverters/NOT gates 950, 954, 958, 962, three NOR gates 966, 970, 974, a first register 980, which is also referred to as "valid_start_reg," and a second register 986, which is also referred to as "dec_en_reg." The inverters 950, 954, 958, the NOR gate 966, and the register 980 forms a START command detection module while the inverter 962, the NOR gates 970, 974, and the register 986 form an address decoder enabling/disabling module. The slave address decoder controller depicted in FIG. 9 is one possible embodiment of the slave address decoder controller depicted in FIG. 3. However, the slave address decoder controller depicted in FIG. 3 is not limited to the embodiment shown in FIG. 9.

In the signal timing diagram depicted in FIG. 9, a START command signal, "START," a reset signal, "ResetN," a delayed START command signal, "START_D," and a STOP command signal, "STOP," are input into the slave address decoder controller 904 and a decoder enabling/disabling signal, "DEC_EN," is output from the slave address decoder controller to enable or disable the slave address decoder 302. The register 980 detects a normal/valid START command based on the START command signal, START, the reset signal, ResetN, and the delayed START command signal, START_D. As shown in FIG. 9, the START command signal, START, is inverted by the inverter 950, and the inverted START command signal is input into a clock terminal, "Clk," of the register 980. The reset signal, ResetN, and the delayed START command signal, START_D, are inverted by the inverters 954, 958, and the inverted reset signal and the inverted delayed START command signal are input into the NOR gate 966. The resulting signal from the NOR gate 966 is input into a reset terminal, "ResetN," of the register 980. A voltage signal, "VDD," is input into a data input terminal, "D," of the register 980. Based on the inputs on input terminals, D, Clk, Reset, the register 980 determines that the START command signal, START, is a valid START command or a faulty START command. As shown in FIG. 9, the register 980 generates and stores valid start information, "valid_start."

The register 986 generates a decoder enabling/disabling signal, "DEC_EN," to enable or to disable the slave address decoder 302 to reduce the power consumption of the slave address decoder, based on the START command signal, START, the reset signal, ResetN, the delayed START command signal, START_D, and the STOP command signal, STOP. As shown in FIG. 9, the inverted reset signal is input into one terminal of the NOR gate 974, while the STOP command signal, STOP, is input into the other terminal of the NOR gate. The resulting signal from the NOR gate 974 is input into a set terminal, "Setn," of the register 986, and the inverted delayed START command signal is input into a clock terminal, "Clk," of the register 986. The valid start information, "valid_start," stored in the register 980 is input into one terminal of the NOR gate 970 and an inverted version of the decoder enabling/disabling signal, DEC_EN, from the inverter 962 is input into the other terminal of the NOR gate 970. The result from the NOR gate 970 is input into a data input terminal, "D," of the register 986. Based on the inputs, the register generates the decoder enabling/disabling signal, DEC_EN.

Figure 10:
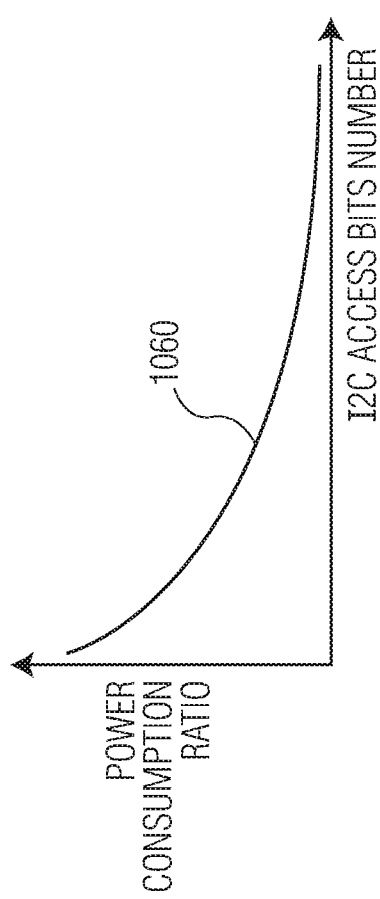
FIG. 10 illustrates an example of a power consumption trend for an address decoder of the communications device depicted in FIG. 3 with/without address decoder control.

FIG. 10 illustrates an example of a power consumption trend for the address decoder 302 with/without the above-described address decoder control. In particular, FIG. 10 depicts a plot 1060 of the ratio between the power consumption of the address decoder circuit with address decoder control by the slave address decoder controller and the power consumption of the address decoder circuit without address decoder control by the slave address decoder controller versus the number of I2C access bits. The I2C slave access bits are the number of I2C slave address bits corresponding to an I2C master device write/read operation. Without the slave address decoder controller, the slave address decoder consumes power continuously, and the power consumption of the slave address decoder linearly increases with the total I2C bus accessing time and the number of access bits. With the slave address decoder controller, the slave address decoder only consumes power during the address decoding time, $T_{DEC}$. Because an I2C master device sends out a start command for each I2C slave access, the ratio between the address decoding time, $T_{DEC}$, and the total I2C bus accessing time decreases when the number of accessing bits increases. As shown in FIG. 10, the ratio between the power consumption of the slave address decoder with address decoder control and the power consumption of the slave address decoder without address decoder control decreases when the number of I2C access bits increases.

Figure 11:
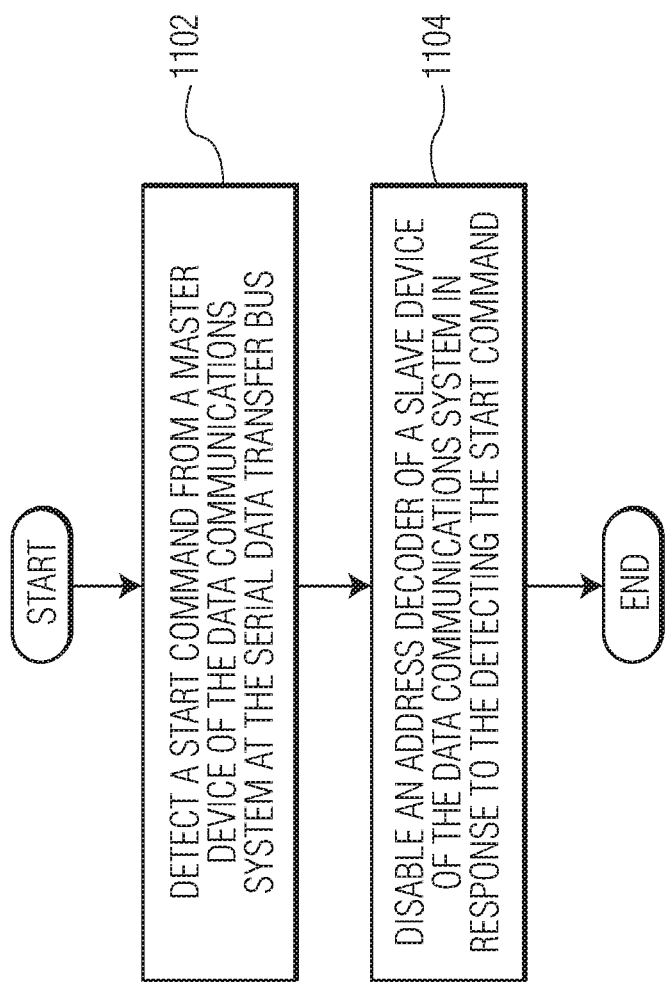
FIG. 11 is a process flow diagram of a method for address decoding in a data communications system using a serial data transfer bus in accordance with an embodiment of the invention.

FIG. 11 is a process flow diagram of a method for address decoding in a data communications system using a serial data transfer bus in accordance with an embodiment of the invention. At block 1102, a start command from a master device of the data communications system at the serial data transfer bus is detected. At block 1104, an address decoder of a slave device of the data communications system is disabled in response to the detecting the start command. The slave device may be similar to or the same as the slave devices 140, 340 depicted in FIGS. 1 and 3. The master device may be similar to or the same as the master device 130 depicted in FIG. 1.

Figure 12:
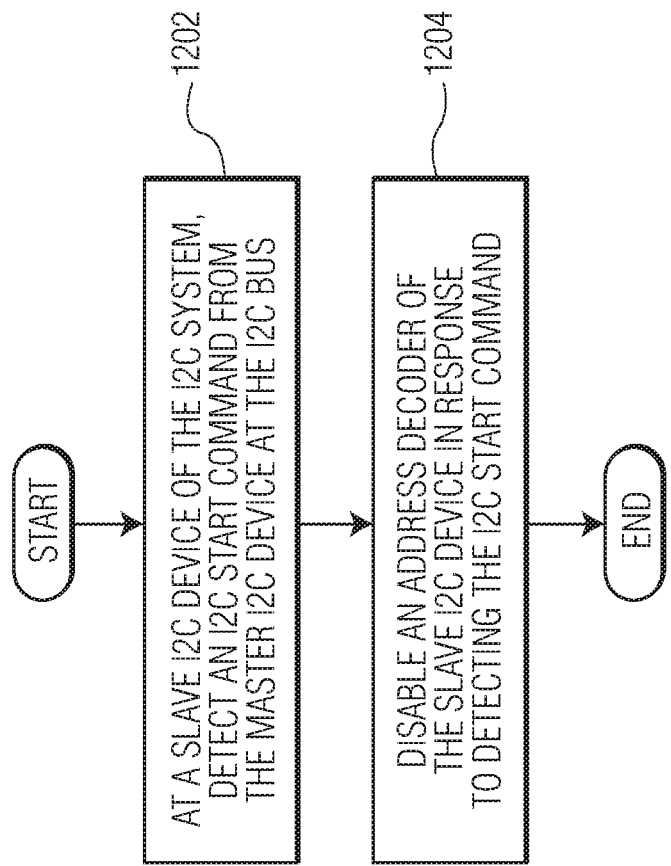
FIG. 12 is a process flow diagram of a method for address decoding in an I2C system that includes a master I2C device and at least one slave I2C device that are connected by an I2C bus including an SDA line and an SCL line in accordance with an embodiment of the invention.

FIG. 12 is a process flow diagram of a method for address decoding in an I2C system that includes a master I2C device and at least one slave I2C device that are connected by an I2C bus including an SDA line and an SCL line in accordance with an embodiment of the invention. At block 1202, at a slave I2C device of the I2C system, an I2C start command from the master I2C device at the I2C bus is detected. At block 1204, an address decoder of the slave I2C device is disabled in response to detecting the I2C start command. The slave I2C device may be similar to or the same as the slave devices 140, 340 depicted in FIGS. 1 and 3. The master I2C device may be similar to or the same as the master device 130 depicted in FIG. 1.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for address decoding in a data communications system using a serial data transfer bus, the method comprising:
   detecting a start command from a master device of the data communications system at the serial data transfer bus; and
   disabling an address decoder of a slave device of the data communications system in response to detecting the start command.

2. The method of claim 1, wherein the start command instructs the slave device to begin a data transfer with the master device.

3. The method of claim 1, further comprising enabling the address decoder of the slave device during the start command and during a delayed version of the start command.

4. The method of claim 1, wherein detecting the start command from the master device comprises detecting an overlap between the start command and a delayed version of the start command.

5. The method of claim 4, wherein detecting the overlap between the start command and the delayed version of the start command comprises determining whether a rising edge of the delayed version of the start command is located between a rising edge of the start command and a falling edge of the start command.

6. The method of claim 5, further comprising causing the address decoder of the slave device to decode an address for the slave device during the start command and the overlap between the start command and the delayed version of the start command.

7. The method of claim 5, further comprising:
enabling the address decoder of the slave device during the start command and during the delayed version of the start command; and
disabling the address decoder of the slave device of the data communications system after a falling edge of the delayed version of the start command.

8. The method of claim 1, further comprising enabling the address decoder of the slave device in response to a stop command from the master device.

9. The method of claim 8, wherein enabling the address decoder of the slave device in response to the stop command from the master device comprises enabling the address decoder of the slave device after a falling edge of the stop command.

10. The method of claim 8, wherein the stop command instructs the slave device to terminate a data transfer with the master device.

11. A method for address decoding in an I2C system that includes a master I2C device and at least one slave I2C device that are connected by an I2C bus including an SDA line and an SCL line, the method comprising:
at a slave I2C device of the I2C system, detecting an I2C start command from the master I2C device at the I2C bus; and
disabling an address decoder of the slave I2C device in response to detecting the I2C start command.

12. The method of claim 11, wherein the I2C start command instructs the slave I2C device to begin a data transfer with the master I2C device.

13. The method of claim 11, further comprising enabling the address decoder of the slave I2C device during the I2C start command and during a delayed version of the I2C start command.

14. The method of claim 11, wherein detecting the I2C start command from the master I2C device comprises detecting an overlap between the I2C start command and a delayed version of the I2C start command by determining whether a rising edge of the delayed version of the I2C start command is located between a rising edge of the I2C start command and a falling edge of the I2C start command.

15. The method of claim 14, further comprising causing the address decoder of the slave I2C device to decode an I2C address for the slave I2C device during the I2C start command and the overlap between the I2C start command and the delayed version of the I2C start command.

16. The method of claim 15, further comprising:
enabling the address decoder of the slave I2C device during the I2C start command and during the delayed version of the I2C start command; and
disabling the address decoder of the slave I2C device after a falling edge of the delayed version of the I2C start command.

17. The method of claim 11, further comprising enabling the address decoder of the slave I2C device in response to an I2C stop command from the master I2C device by enabling the address decoder of the slave I2C device after a falling edge of the I2C stop command.

18. The method of claim 17, wherein the I2C stop command instructs the slave I2C device to terminate a data transfer with the master I2C device.

19. An I2C device with connection to an I2C bus including an SDA line and an SCL line, the I2C device comprising:
an address decoder configured to decode an address for the I2C device; and
an address decoder controller configured to:
detect an I2C start command from a master I2C device at the I2C bus; and
disable the address decoder in response to the detection of the I2C start command.

20. The I2C device of claim 19,
wherein the I2C start command instructs the I2C device to begin a data transfer with the master I2C device,
wherein the address decoder controller is further configured to detect an overlap between the I2C start command and a delayed version of the I2C start command, to cause the address decoder to decode the I2C address for the I2C device during the I2C start command and the overlap between the I2C start command and the delayed version of the I2C start command, and to disable the address decoder after a falling edge of the delayed version of the I2C start command.

* * * * *